United States Patent [19]

Peterson

[11] 4,268,112
[45] May 19, 1981

[54] FIBER OPTIC CONNECTOR USING GRADIENT INDEX LENSES

[75] Inventor: Kenneth P. Peterson, Stamford, Conn.

[73] Assignee: International Telephone and Telegraph Corporation, New York, N.Y.

[21] Appl. No.: 37,974

[22] Filed: May 11, 1979

Related U.S. Application Data

[63] Continuation of Ser. No. 797,969, May 18, 1977, abandoned.

[51] Int. Cl.³ .............................................. G02B 5/14
[52] U.S. Cl. .............................. 350/96.18; 350/96.21; 350/413
[58] Field of Search ............... 350/96.15, 96.18, 96.21, 350/96.31, 175 GN, 175 SL

[56] References Cited

U.S. PATENT DOCUMENTS

| | | | |
|---|---|---|---|
| 3,566,128 | 2/1971 | Arnuad | 350/175 SL X |
| 3,649,098 | 3/1972 | Suverison | 350/96.18 |
| 3,666,347 | 5/1972 | Kitano et al. | 350/96.18 |
| 3,718,383 | 2/1973 | Moore | 350/175 GN |
| 3,734,594 | 5/1973 | Trambarulo | 350/96.21 |
| 3,768,146 | 10/1973 | Braun et al. | 350/96.21 X |
| 3,864,019 | 2/1975 | Smolinsky et al. | 350/96.17 |
| 3,950,075 | 4/1976 | Cook et al. | 350/96.18 X |
| 3,995,935 | 12/1976 | McCartney | 350/96.15 |
| 4,025,157 | 5/1977 | Martin | 350/96.18 |

FOREIGN PATENT DOCUMENTS

| | | | |
|---|---|---|---|
| 1017354 | 1/1966 | United Kingdom | 350/96.18 |
| 1257359 | 12/1971 | United Kingdom | 350/175 SL |
| 1429843 | 3/1976 | United Kingdom | 350/96.18 |

OTHER PUBLICATIONS

Dakss, "Coupling Light Sources to Fibers", *Laser Focus*, vol. 11, No. 12, Dec. 1975, pp. 31-34.
Peeler et al., "Virtual Source Luneberg Lenses", *I.R.E. Trans. (Antennas & Prop.)*, vol. AP-2, No. 2, Jul. 1954, pp. 94-99.
Cohen et al., "Microlenses For Coupling Junction Lasers to Optical Fibers", *Appl. Optics*, vol. 13, No. 1, Jan. 1974, pp. 89-94.
Zernike, "Luneberg Lens for Optical Waveguide Use", *Optics Commun.*, vol. 12, No. 4, Dec. 1974, pp. 379-381.
Paek et al., "Formation of a Spherical Lens at Optical Fiber Ends . . . ", *Appl. Optics*, vol. 14, No. 2, Feb. 1975, pp. 294-298.

*Primary Examiner*—John K. Corbin
*Assistant Examiner*—John D. Lee
*Attorney, Agent, or Firm*—John T. O'Halloran; David M. Quinlan

[57] ABSTRACT

To reduce energy losses which result from the misalignment of cores of connected optical fibers, the energy emanating from the core of a transmitting fiber is expanded over a larger area and then refocused onto the core of a receiving fiber. Several embodiments, based on the optical transmission characteristics of a Luneberg lens, are presented for terminating optical fibers. Since the terminations are substantially larger in size than the core itself, field coupling is greatly facilitated. Further, since the energy has been expanded, a slight misalignment of transmitting and receiving terminations results in a much lower loss than that which would result if the optical fibers were coupled directly with the same amount of core misalignment.

9 Claims, 17 Drawing Figures

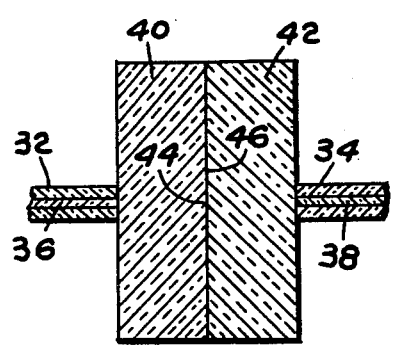
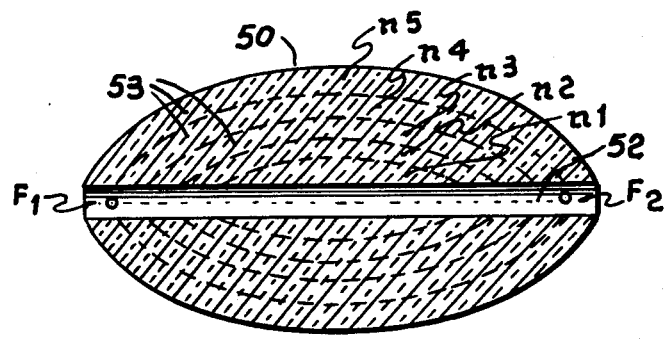
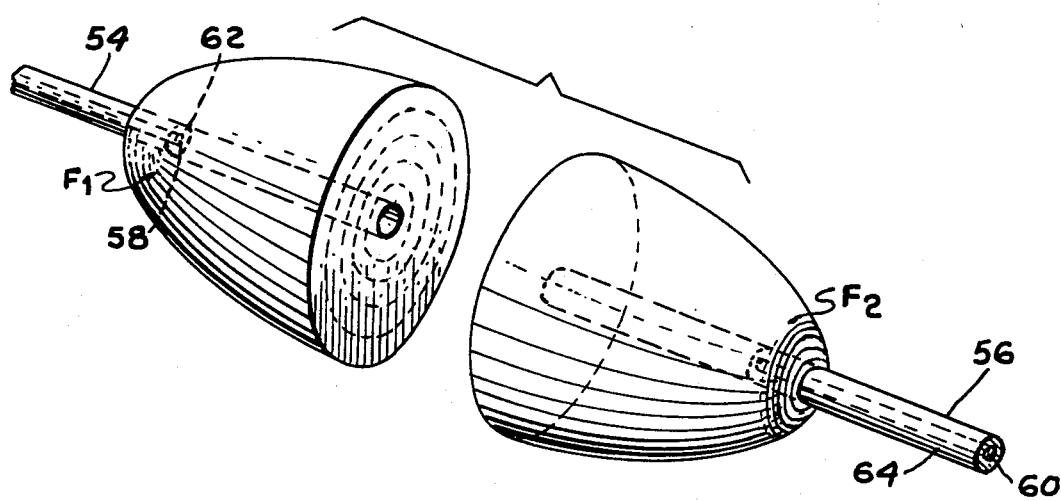
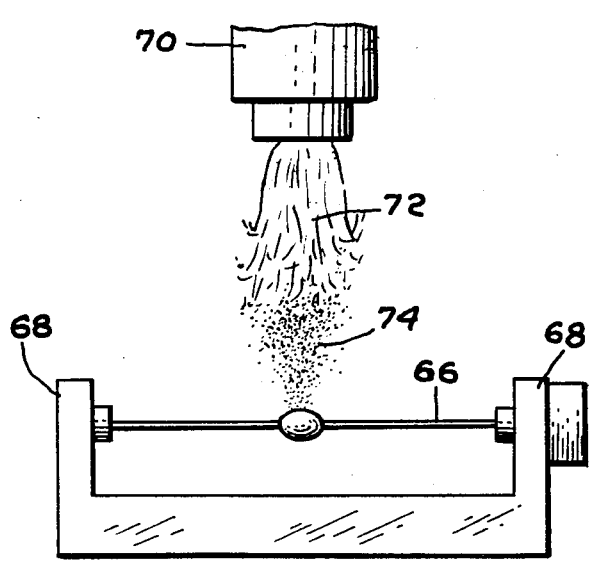
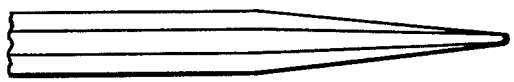

FIBER OPTIC CONNECTOR USING GRADIENT INDEX LENSES

This is a continuation of application Ser. No. 797,969, filed May 18, 1977, now abandoned.

BACKGROUND OF THE INVENTION

This invention relates generally to an optical fiber connector, and, more particularly, to an optical fiber connector which causes light energy transmitted by the core of a transmitting fiber to be expanded over a larger area in order to reduce losses due to misalignment with the core of a receiving fiber.

It is well known in the art that information bearing light can be caused to propagate along a transparent fiber structure which has a higher refractive index than its surroundings. To be effective, excessive attenuation of the transmitted light must be avoided. Within the fiber, these losses may result from one or more causes, such as scattering and absorption; however, many of the problems in providing practical low loss glassy materials and production techniques for low-loss fibers have been largely overcome. An article entitled "Fiber Optics" by Narinder S. Kapany published in Scientific American, Volume 203, pages 72–81, November 1960, provides useful background with respect to the theoretical and practical aspects of fiber optic transmission, and a further detailed discussion at this time is not deemed necessary.

Notwithstanding the above, if optical fibers are to be used as practical signal transmission media, practical, low-loss connectors for coupling the optical fibers must be provided. The primary consideration is one of transfer efficiency. That is, in order to reduce light losses between connected optical fibers, the fiber ends must be precisely aligned both axially and angularly so that there is no separation at the point of abutment and no lateral separation (axial misalignment) as these will result in a loss of light energy at the connector, thereby reducing the connector's transfer efficiency. This problem is further discussed in the Bell System Technical Journal, Volume 50, No. 10, December 1971 in an article by D. L. Bisbee entitled "Measurement of Loss due to Offset and End Separation of Optical Fibers".

When one considers that an optical fiber may have a core diameter in the order of a few microns and an overall diameter of, for example, 100 microns, the difficulty in providing alignment when connecting two optical fibers can be appreciated, especially when one considers that connecting must often be accomplished out in the field by installers, repairmen and the like, without the aid of complex laboratory and precision aligning equipment. This prospect of precision aligning and connecting optical fibers which may be as small and flimsy as human hairs would frustrate even the most dextrous of technicians.

Contributing to the overall problem of misalignment when connecting optical fibers is the fact that typically, the optical fiber core and its outside cladding are not concentric. Clearly then, even if the fibers could be perfectly aligned, the cores themselves might well remain misaligned, resulting in loss of transmitted energy.

One known device for aligning optical fibers is shown and described in U.S. Pat. No. 3,768,146 issued Oct. 30, 1973 and comprises a base plate having V-shaped grooves therein for holding the fibers. A metallic sleeve is crimped over adjacent fiber ends by a compression plate to secure and align the fibers within the groove. A second known device, shown and described in U.S. Pat. No. 3,734,594 issued May 22, 1973, comprises a deformable, angular core disposed between a pair of metallic pressure plates. The two fibers to be spliced or connected are inserted into opposite ends of the core, and a longitudinal force is applied to the plates. This causes the core to deform radially, simultaneously aligning and mechanically securing the fibers.

Both of the above described known devices do not provide sufficient accuracy for joining and aligning small core optical fibers. An axial displacement of five microns, for example, causes a loss of 1 DB for a 25 micron core fiber. Available displacement tolerances of about ±50 microns in conventional devices is therefore highly inadequate. A satisfactory device would require a tolerance of about ±2 microns, and any technique for aligning fiber optic cores using a mechanical device presents serious problems.

One approach for providing an optic fiber connector which eliminates high losses due to misalignment includes reducing the need for precision connecting of the fibers. This may be accomplished by expanding the light energy from the fiber core throughout a larger area so that misalignment of the larger area interface in the connector yields a tolerable loss of energy. This approach has been considered in British Pat. No. 1,017,354 published January 19, 1966, wherein the described connector includes a transparent body for coupling the ends of two fibers, the transmitting fiber having a larger core diameter than that of the receiving fiber. The transparent body has a semiellipsoidal shape and consists of a material having the proper light-transmitting properties and an inner reflecting surface which is optically polished and metalized to provide a mirror-like surface. Light emanating from the cores of the transmitting fibers and impinging on the reflecting surface are reflected onto the cores of the receiving fibers. However, to ensure that most of the transmitted energy is received by the receiving fiber, the connecting device has a relatively complex shape, that is, that portion nearest the transmitting fiber of a larger cross-section is cylindrical, that portion nearest the receiving fiber is conical and the intermediate portion ellipsoidal. While this arrangement may be suitable for its intended purpose, i.e., coupling light transmitted from one element to another wherein each element has a different cross-section, it does not provide a simple connecting technique.

A second known arrangement for coupling single optic fibers is described in U.S. Pat. No. 3,995,935 issued Dec. 7, 1976 entitled "Optical Coupler". This patent teaches the use of an optical connector comprising an optical chamber having a reflective wall. The chamber is filled with a light transmitting filler so that light emitted into the chamber by a light-emitting device will reflect off the chamber wall and impinge upon the outer surface of a receiving fiber. Two chamber embodiments are shown. The first is a rotated conical section, and the second a rotated truncated parabola. However, in both cases, the slope of the reflective wall is dependent upon the ratio of the index of refraction of the receiving fiber core to the index of refraction of the chamber filler. This indicates that different connectors having different wall slopes would be required for fibers having cores with different indices of refraction. Since it is well known that the numerous applications for optical fibers in modern technology require fibers having many different indices of refraction, this technique requires the availability of many different connectors having various different shapes.

SUMMARY OF THE INVENTION

It is therefore the primary object of the present invention to provide a simple and inexpensive means for connecting optical fibers.

It is a further object of the present invention to provide a connecting arrangement for optical fibers which may be employed without the need for precision coupling equipment and still result in little loss of transmitted energy.

Finally, it is an object of the invention to provide a connector which may be used in conjunction with a large number of types of optical fibers, i.e., a universal optical fiber connector.

According to a broad aspect of the invention, there is provided an optical fiber connector comprising: means, having a focal point, for controllably expanding energy emanating from said focal point and for focusing energy propagating toward said focal point; and means for coupling the end of an optical fiber to said focal point.

According to a further aspect of the invention, there is provided an apparatus for connecting optical fibers comprising: first means for controllably expanding energy emanating from a first focal point; and second means coupled to said first means for focusing energy on a second focal point.

According to a further aspect of the invention, there is provided a method of forming an optical connector having a varying index of refraction comprising: providing a cylindrical starting member; applying an optically transmissive material onto said starting member to form a bead having an index of refraction which varies from a maximum at the center of the bead to a minimum at the bead's surface; removing said starting member to form a longitudinal hole in said bead; and cutting said bead in a plane perpendicular to said longitudinal hole to form two sections of an optical fiber connector.

By expanding the energy emanating from the core of a transmitting fiber and then refocusing the expanded energy onto the core of a receiving fiber, the percent energy loss due to a given axial misalignment of the expanded region will be substantially lower than the loss which would occur if the same given misalignment existed between the cores of the transmitting and receiving fibers directly, i.e. without expansion.

In this manner, personnel installing fiber optic communication equipment or merely repairing existing fiber optic systems can interconnect optical fibers without requiring the use of special and complicated precision equipment. Further, the inventive connector avoids the necessity of stock piling and transporting large numbers of different types of connectors to accommodate different types of fibers.

The above and other objects of the present invention will be more clearly understood from the following detailed description taken in conjunction with the accompanying drawings in which:

BRIEF DESCRIPTION OF THE DRAWINGS

FIG. 7 illustrates how the lenses of FIG. 6 may be used to connect optical fibers.

FIG. 8 is a cross-section of an elliptical bead having an index of refraction gradient and a precision hole therethrough.

FIG. 9 illustrates how the bead of FIG. 8 may be cut and used as a connecting device for flat-ended optical fibers.

FIG. 10 illustrates how the bead of FIG. 8 may be fabricated using the flame hydrolysis technique.

FIG. 11 illustrates an optical fiber having a tapered end for insertion into the bead halves of FIG. 9.

DESCRIPTION OF THE PREFERRED EMBODIMENT

Figure 1:
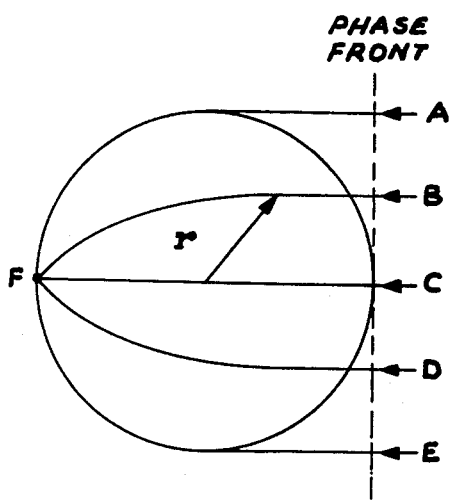
FIG. 1 is a cross-section of a spherical Luneberg lens illustrating how parallel rays of energy incident on one hemisphere are propagated through the sphere and focused at a point on the opposite hemisphere.

The inventive optical connector proceeds from the known transmission characteristics of a Luneberg lens of the type described by R. C. Hansen in "Microwave Scanning Antennas", page 214, copyright 1964, Academic Press, Inc. A Luneberg lens shown in FIG. 1 is a dielectric sphere whose index of refraction varies with the distance r from the center in accordance with the relation $n=[2-(r/R)^2]^{\frac{1}{2}}$ where R is the radius of the sphere. The lens has the property of collecting the energy which falls upon the surface of one hemisphere, refracting it through the sphere, and bringing the energy to focus at the center of the surface of the opposite hemisphere. Similarly, if energy is fed from a source at any point on the spherical surface, it is propagated through the sphere and is focused into parallel rays emerging from the other side of the sphere. Perfect focusing is obtained for all feed positions on opposite hemispheres.

Figure 2:
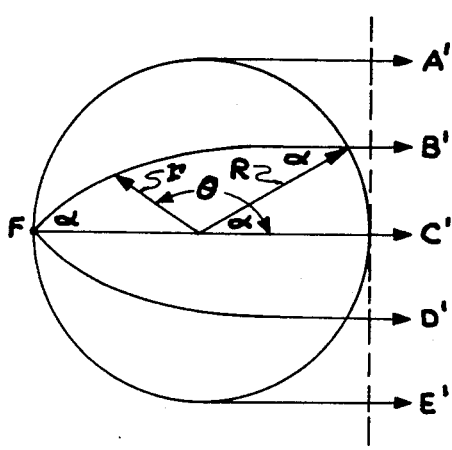
FIG. 2 is a cross-section of a spherical Luneberg lens illustrating how light emanating from a point source on one hemisphere propagates through the sphere and emerges as parallel rays at the opposite hemisphere.

A central cross-section of the sphere is shown in FIG. 1 where light rays A, B, C, D and E impinging on the surface of the right-hand hemisphere of the sphere through the phase front are focused onto focal point F. If, as shown in FIG. 2, energy were fed from focal point F, it would propagate through the sphere and be focused into parallel rays A', B', C', D' and E' emerging from the other side of the sphere. The ray paths are sections of ellipses which are given in polar coordinates by the expression $R^2 = \sin^2 \alpha / [1 - \cos \alpha \cos(2\theta - \alpha)]$ where $\alpha$ is the feed angle defining a particular ray.

Figure 3:
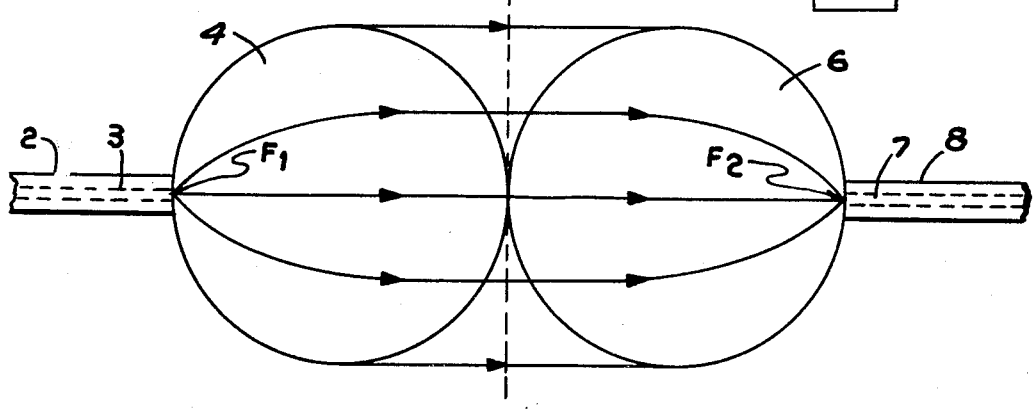
FIG. 3 illustrates how two optical fibers terminated with Luneberg lens may be connected so that light emanating from the core of the transmitting fiber and diverging therefrom is focused onto the core of the receiving fiber.

Referring to FIG. 3 in combining the teachings of FIGS. 1 and 2, it should be clear that if two optical fibers were terminated with Luneberg lenses and the lenses mounted such that the diameter on which the first optic fiber were mounted was colinear with the diameter upon which the second optic fiber were mounted, then substantially all of the transmitted energy emanating from the transmitting fiber 2 having a core 3 at what may be called a substantially point source located at the focal point F1, would propagate through the sphere 4 and be focused into parallel rays at the phase front and would be further propagated through the sphere 6 and refocused at focal point F2 located at the core 7 of a receiving fiber 8. While it is well within the state of the art to mount an optical fiber onto a Luneberg lens as shown in FIG. 3, this arrangement would still present serious problems since it is necessary that the Luneberg spheres be aligned such that the diameters upon which the fibers are mounted are colinear. However, this stringent aligning requirement may be avoided as will be described hereinbelow.

Figure 4:
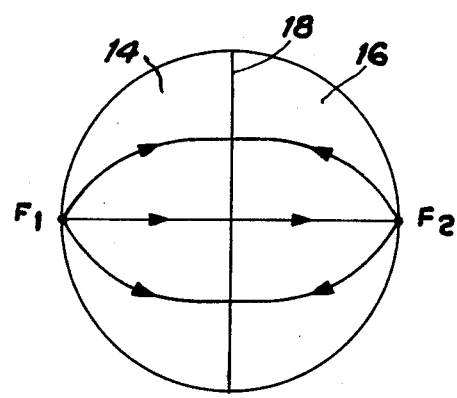
FIG. 4 is a cross-sectional view of a modified Luneberg lens.

Other lenses having optical axes and employing a variation in the refractive index are known. One such lens is a modification of the Maxwell-Fish-Eye lens, in which the complete sphere is replaced by a hemisphere. The optical axis is a line perpendicular to the plane surface and passing through the center of the sphere. The lens is designed to give perfect focusing for a source at the point where the axis touches the sphere surface. In this case, the refractive index of the lens is given by $n = 2/(1 + r^2)$ where r is the radial coordinate whose maximum value is unity. Two such lenses 14 and 16 are shown in FIG. 4, said lenses having their planar surfaces joined at interface 18. Light emanating at focal point F1 will be transmitted through both lenses and refocused at focal point F2.

If optical fibers 20 and 22 shown in FIG. 5 having cores 24 and 26 were factory-precision mounted to the optical axes of modified Luneberg lenses 28 and 30 of the type described with reference to FIG. 4, it would now be a relatively simple matter to connect two fibers by merely coupling the flat surfaces of the terminating lenses. The two lenses could be simply mechanically aligned or secured by an index matching adhesive, such as epoxy shown at 31.

Since the light energy has now been expanded, the slight misalignment of lenses 20 and 30 will result in a much lower loss of transmitted energy than if the same amount of misalignment occurred in joining the two fibers directly.

Figure 6:
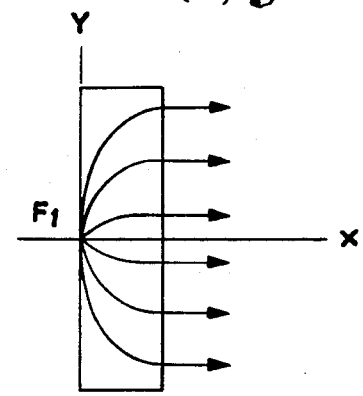
FIG. 6 illustrates a second modification of a Luneberg lens.

A third type of variable index lens, shown in FIG. 6, is the Luneberg constant thickness lens. In this lens, an x coordinate through the center of the lens is the optical axis. Light impinging on this constant thickness lens at a point source F1 on the optical axis at x=0 will appear at the opposite surface of the lens as parallel rays shown in FIG. 6. The refractive index of this type of lens varies only with the y coordinate according to the expression $n = n_0 \text{sech}(y\pi/2T)$ where $n_0$ is the index of refraction at y=0 and T is the thickness of the lens.

Figure 5:
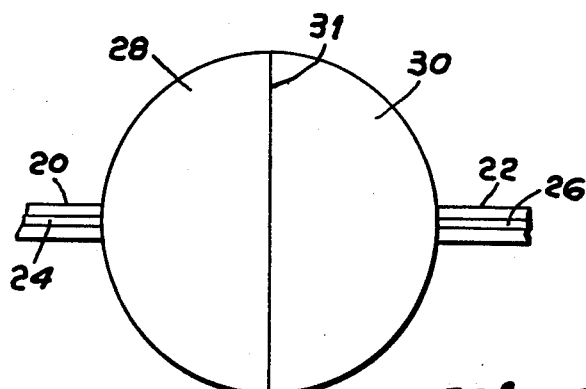
FIG. 5 illustrates how the lens of FIG. 4 may be used as terminations for optical fibers so that said optical fibers may be easily connected.

As in the embodiment shown in FIG. 5, optical fibers 32 and 34 shown in FIG. 7 having cores 36 and 38 mounted on the optical axes of lenses 40 and 42 may be easily coupled by joining flat surfaces 44 and 46 in any suitable manner. The lens may be coupled mechanically or adhesively using an index matching adhesive. Again, any misalignment of lenses 40 and 42 would result in much smaller losses than if an attempt were made to connect the fibers directly.

Applying the Luneberg principles, an elliptical bead may be fabricated, said bead having a graded index of refraction and having a precision hole therethrough which is geometrically equidistant from the locus of variable refractive index lines. FIG. 8 shows such a structure wherein an elliptical bead 50 having a precision hole 52 therethrough is formed by successive layers 53 of glassy material, the index of refraction of each successive outer layer being lower than the corresponding inner layer, i.e., n1 greater than n2, n2 greater than n3, n3 greater than n4, etc. The structure shown in FIG. 8 also has focal points located at F1 and F2. If such a bead were now cut perpendicular to the precision hole 52, each half would form an optic fiber termination for coupling to similar terminations.

Referring to FIG. 9, optical fibers 54 and 56 having cores 58 and 60 therethrough and cladding layers 62 and 64 are precision-mounted in hole 52 such that the ends of the fibers lie at focal points F1 and F2. The central cavity 59 formed between the two fibers is filled with an optically transmissive material whose index of refraction matches that of the fiber cores.

When the two halves of the elliptical bead are coupled together, there results a lens structure which focuses energy radiating from the transmitting fiber 54 to the receiving fiber 56. Thus, each half of the bead forms an interface of an optical connector. As stated with respect to the previous embodiments, the bead may be coupled mechanically or through the use of a suitable glassy adhesive material. Due to the fact that the transmitted energy is substantially expanded in the bead, a small amount of misalignment will not result in the great losses which would almost certainly accompany any attempts to connect the fibers directly.

One method of fabricating such a bead is illustrated in FIG. 10. A precision drawn wire 66 of, for example, tungsten, is mounted and suspended in a suitable rotating lathe generally denoted 68. As the wire 66 is rotating, a variable gradient index glass is deposited on the wire using the well known flame hydrolysis process. A first coating of glass is applied to the cylindrical wire by means of flame hydrolysis burner 70. Burner 70 emits a flame 72 in which a gas vapor mixture is hydrolyzed to form a glass soot. The soot leaves flame 72 in a stream 74 and is directed towards and deposits on tungsten wire 66. Fuel, gas and oxygen or air are supplied to burner 70 from sources not shown. Wire 66 is suitably supported and is rotated for uniform deposition in the soot.

After a first layer is applied to the starting member, the gas vapor mixture is changed for each successive layer so that each of the pluralities of layers have a composition, the refractive index of which is lower than all preceding layers. Of course, the composition of the gas-vapor mixture may be continuously changed to provide a continuous refractive index gradient.

The layers should be formed of a glass having a minimum light absorption characteristic and although any optical quality glass may be used, a particularly suitable glass from which to make a coupling device of the type described is fused silica. Since it is necessary that the bead have a radially gradient index of refraction, it must therefore have a radially varying composition. Accordingly, each layer may be formed from fused silica doped with a different quantity or kind of material to provide a layer having the desired index of refraction. Many suitable materials can be used as a dopant, alone or in combination with others. These include, but are not limited to, titanium oxide, tantalum oxide, tin oxide, niobium oxide, zirconium oxide, aluminum oxide, lanthanum oxide, germanium oxide, boron and arsenic. The maximum amount of dopant to be added is the minimum amount which will yield the desired index of refraction of the glass.

A particularly effective method for forming or applying the successive layers is similar to the flame hydrolysis process described in U.S. Pat. No. 2,326,059 issued to M. E. Nordberg wherein the tetrachlorides of silicon and titanium are vaporized in the gas stream of an oxygas burner and the resultant mixture of oxides deposited to make a preform. Alternatively, the well known chemical vapor deposition (CVD) process may be employed to form the bead.

The thickness of each layer is determined by the amount of soot deposited, which is primarily controlled by the flow rate and the time allowed for deposition. To provide a dense uniform coating, the soot applied may be sintered as deposited if the temperature is high enough or it may thereafter be sintered in a subsequent operation.

After the bead has been formed, the tungsten wire may be removed by simply withdrawing the wire after the composite wire/bead structure has cooled due to the different coefficients of thermal expansion of the tungsten wire and the bead. Naturally, the diameter of the precision hole should be chosen to be slightly larger than that of the optical fibers to be connected, thus allowing easy insertion of the fiber ends into both sides of the bead.

The bead is next cut perpendicularly to the precision hole as illustrated in FIG. 9. Each half of the bead is then used to terminate an optical fiber by inserting the fiber to a depth sufficient to cause the exposed optical fiber cores to lie at focal points F1 and F2. This may be easily done using precision factory equipment. Now that the fibers have been properly terminated, it can be seen that it would be a relatively simple matter to join halves of the elliptical bead. The actual connecting may be accomplished either mechanically or through the use of a suitable adhesive, for instance, epoxy. Even though the bead halves may not be exactly aligned, the losses which result from this misalignment are far less than a corresponding misalignment between the actual fiber ends.

As shown in FIG. 9, the fiber ends are cut in a plane perpendicular to the longitudinal axis of the fiber and as a result, the ends of the fiber have to be positioned at the focal points of the gradient index bead. A compromise may be achieved by drawing the ends of the fiber to a tapered point as shown in FIG. 11. In this manner, the energy leaving the tapered portion of the transmitted fiber would be dispersed over the length of the taper and collected by the receiving fiber reciprocally. This avoids the necessity of precision focal alignment imposed by flat-ended fibers.

Figure 12:
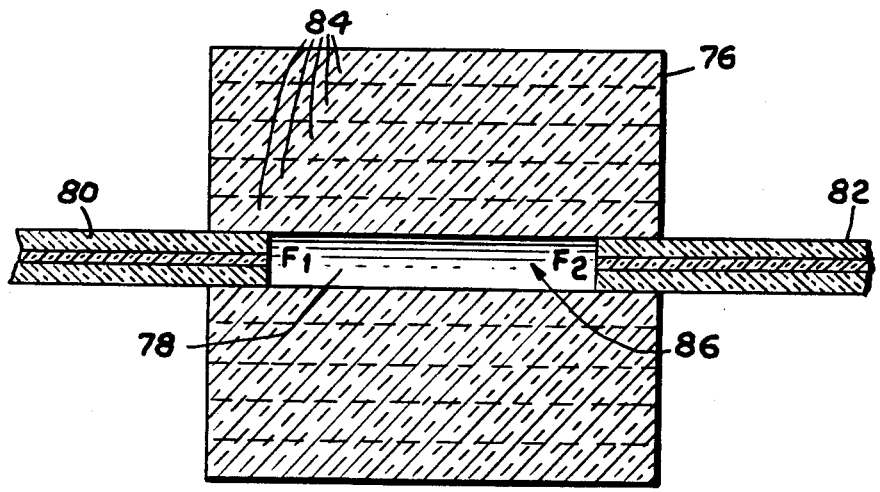
FIG. 12 is a cross-section of a cylindrical lens having an index of refraction gradient and a precision hole therethrough.
Figure 13:
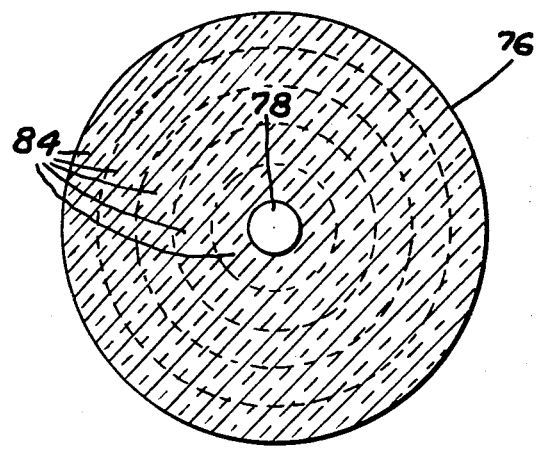
FIG. 13 is a cross-section of a cylindrical lens of FIG. 12, taken along a plane perpendicular to the axis of the cylinder.

An extension of the embodiment shown in FIG. 7 is shown in FIGS. 12 and 13. In this case, a graded index cylindrical member 76 having a precision hole 78 therethrough is employed to couple two fibers 80 and 82. The disc is formed by successive layers 84 of glassy material, the index of refraction of each successive outer layer being lower than the corresponding inner layer. The structure shown in FIG. 12 has two focal points located at F1 and F2. The empty space 86 formed in the precision hole after insertion of the fibers is filled with an optical filler whose index of refraction matches that of the fiber cores. By properly selecting the thickness of the cylindrical member in accordance with the above teachings, energy emanating from the core of transmitting fiber 80 at focal point F1 will be expanded and then focused onto the core of the receiving fiber 82 located at focal point F2.

Figure 14:
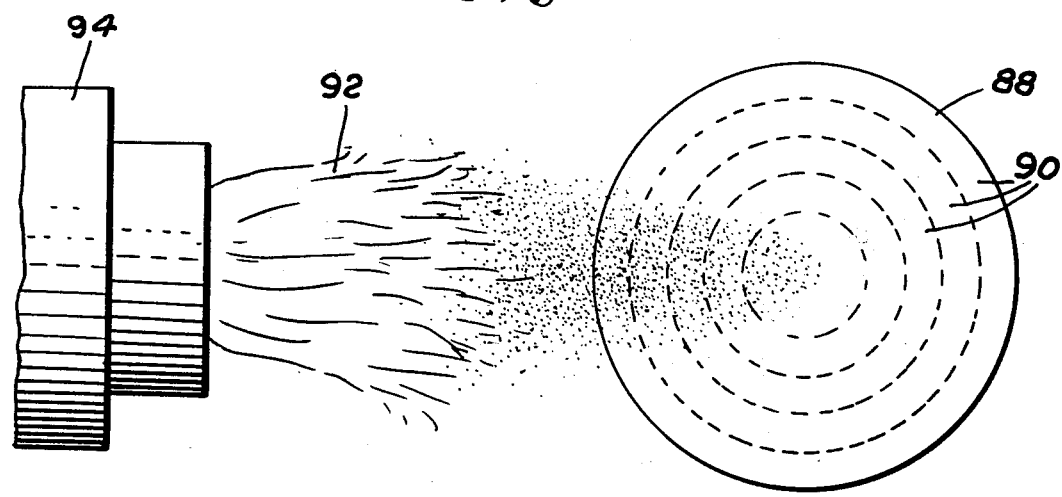
FIG. 14 illustrates how the lens of FIG. 12 may be fabricated using a flame hydrolysis technique.
Figure 15:
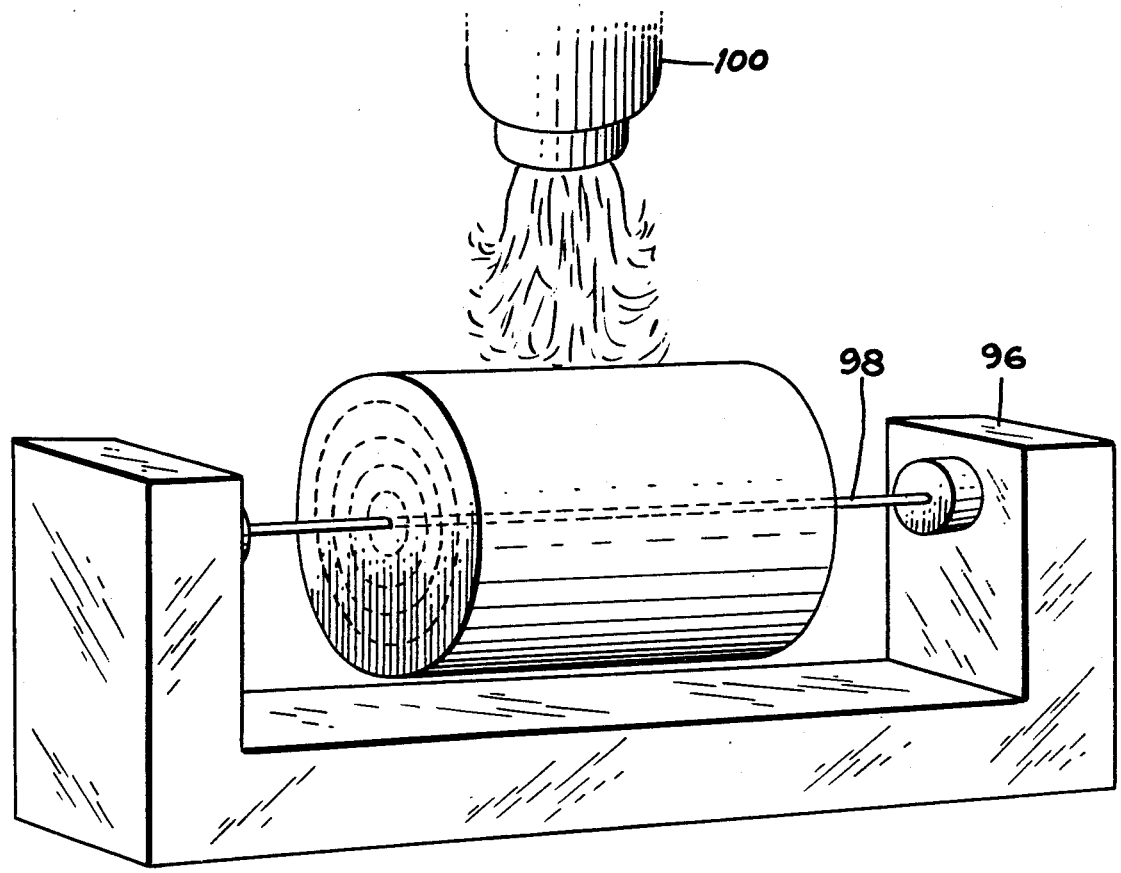
FIG. 15 illustrates the apparatus utilized to fabricate the cylindrical lens of FIG. 12.

One method of fabricating the cylindrical splice of FIGS. 12 and 13 is illustrated in FIGS. 14 and 15. A starting member of, for example, silica 88 has deposited on its inner surface successive layers of glassy material 90 by passing a gas vapor mixture through the flame 92 of burner 94. As described with reference to FIG. 10, a glass soot is developed and deposits on the inner surface of tube 88. After the first inner layer is applied to the starting member, the gas vapor mixture is changed for each successive layer so that each of the pluralities of layers have a composition, the refractive index of which is higher than all preceding layers. Alternatively, the composition of a gas-vapor mixture may be continuously changed to provide a continuous refractive index grading. Suitable dopants to vary the refractive index are mentioned above. When the desired number of layers has been applied to the inner surface of tube 88, the structure is then moved to a rotating lathe 96 and a wire 98, for example tungsten is guided through the center of the layered structure. The tube is next heated via heater 100 to cause it to collapse upon wire 98. To provide uniform collapse, heater 100 may be moved along the length of the tube and simultaneously the tube may be rotated. After the tube is fully collapsed upon wire 98, the wire may be removed as discussed previously. The collapsed tube, now having a precision hole therethrough, is then cut, thus forming lenses of the correct thickness. Again, the diameter of the precision hole should be chosen to be slightly larger than that of the optical fibers to be connected, thus allowing easy insertion of the fiber ends into both sides of the bead.

Figure 16:
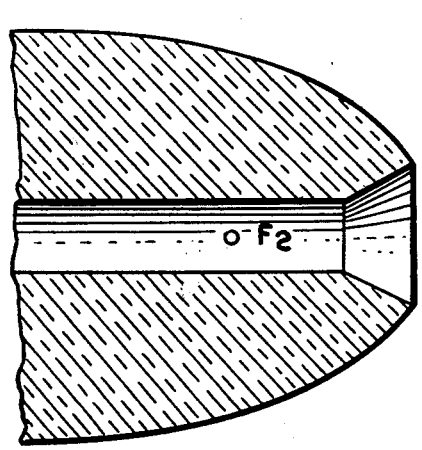
FIG. 16 is a partial section of the bead shown in FIG. 8.
Figure 17:
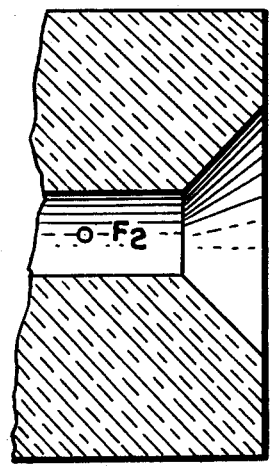
FIG. 17 is a partial section of the cylindrical lens shown in FIG. 12.

To facilitate insertion of the fibers into the disc or bead, the area of the disc or bead around the precision hole may be funneled out as shown in FIGS. 16 and 17.

Therefore, as illustrated by the above described embodiments, by suitably expanding the energy emitted by a transmitting fiber and recollecting it at a receiving fiber, losses which result from slight misalignment are greatly reduced. Further, using the techniques described above, coupling in the field requires no precision equipment and can be accomplished in a relatively short amount of time. That part of the coupling process which requires precision bonding can be done in factories where complex precision equipment is available.

While the principles of this invention have been described above in connection with specific apparatus, it is to be understood that this description is made only by way of example and not as a limitation on the scope of the invention as set forth in the objects and features thereof and in the accompanying claims.

What is claimed is:

1. An optical fiber connector for attachment to the end of an optical fiber to enable connection of that optical fiber to another optical fiber, the optical fiber connector comprising an optical lens means, wherein said optical lens means is a solid hemisphere, having:
an optical axis;

a focal point at a first location on said optical axis;

a connector face normal to said optical axis that intersects said optical axis at a second location spaced from said first location for contacting and being secured directly to a corresponding connector face of a second optical lens means, wherein the planar surface of said hemisphere comprises said connector face;

a non-uniform index of refraction formed and arranged for controllably expanding energy received at said focal point on said optical axis, said energy being expanded radially about said optical axis and emerging from said connector face in rays parallel to said optical axis, and for controllably focusing energy received by said connector face in rays parallel to said optical axis radially towards said focal point, wherein the index of refraction n varies according to the expression $n=2/(1+r^2)$ where r is the radius of the hemisphere with a maximum value of unity; and attachment means for attaching the end of an optical fiber core to said optical lens means at said focal point.

2. An optical fiber connector for attachment to the end of an optical fiber to enable connection of that optical fiber to another optical fiber, the optical fiber connector comprising an optical lens means having:

an optical axis, wherein said optical lens means has a constant thickness measured parallel to said optical axis and two planar surfaces normal to said optical axis;

a focal point at a first location on said optical axis on a first of said planar surfaces;

a connector face that intersects said optical axis at a second location spaced from said first location for contacting and being secured directly to a corresponding connector face of a second optical lens means, wherein the second said planar surface comprises said connector face;

a non-uniform index of refraction formed and arranged for controllably expanding energy received at said focal point on said optical axis, said energy being expanded radially about said optical axis and emerging from said connector face in rays parallel to said optical axis, and for controllably focusing energy received by said connector face in rays parallel to said optical axis radially towards said focal point, wherein the index of refraction varies according to the expression $n=n_0 \text{sech}\,(y\pi 2T)$, where y is the distance on a y-axis perpendicular to said optical axis and passing through said focal point, $N_0$ is the index of refraction at $y=0$, and T is the thickness of the lens; and attachment means for attaching the end of an optical fiber core to said optical lens means at said focal point.

3. An optical fiber connector for attachment to the end of an optical fiber to enable connection of that optical fiber to another optical fiber, the optical fiber connector comprising an optical lens means, wherein said optical lens means is substantially one-half of a solid elliptical bead of glassy material, having:

an optical axis;

a focal point at a first location on said optical axis;

a connector face that intersects said optical axis at a second location spaced from said first location for contacting and being secured directly to a corresponding connector face of a second optical lens means;

a non-uniform index of refraction formed and arranged for controllably expanding energy received at said focal point on said optical axis, said energy being expanded radially about said optical axis and emerging from said connector face in rays parallel to said optical axis, and for controllably focusing energy received by said connector face in rays parallel to said optical axis radially towards said focal point, wherein the index of refraction decreases from the center of said bead toward the outer surface of said bead; and attachment means for attaching the end of an optical fiber core to said optical lens means at said focal point.

4. The optical fiber connector recited in claim 3 wherein said solid elliptical bead comprises a plurality of distinct layers of optical material, each said layer having a uniform index of refraction lower than the index of refraction of the adjacent inner layer.

5. The optical fiber connector recited in claim 4 wherein said attachment means comprises a precision hole through said bead.

6. The optical fiber connector recited in claim 5 wherein said optical material is fused silica containing a dopant.

7. The optical fiber connector recited in claim 6 wherein said fused silica is doped with at least one material selected from the group consisting of titanium oxide, tantalum oxide, tin oxide, niobium oxide, zirconium oxide, aluminum oxide, lanthanum oxide and germanium oxide.

8. The optical fiber connector as described in claim 1, 2 or 3, additionally comprising an optical fiber having a core coupled to said optical lens means at said focal point by said attachment means with the end of the core of said optical fiber at said focal point.

9. An optical fiber connector comprising two optical lens means like that recited in claim 1, 2 or 3 and two optical fibers, wherein:

the first said optical fiber is attached to the first said optical lens means with the end of the optical fiber core of said first optical fiber at the focal point of said first optical lens means;

the second said optical fiber is attached to the second said optical lens means with the end of the optical fiber core of said second optical fiber at the focal point of said second optical lens means; and the connector faces of both said optical lens means are secured together in mutually facing relationship with said optical axes in substantial alignment.

* * * * *